(12) United States Patent
Lv et al.

(10) Patent No.: US 9,451,398 B2
(45) Date of Patent: Sep. 20, 2016

(54) METHOD AND DEVICE FOR PUSHING INFORMATION

(71) Applicant: TENCENT TECHNOLOGY (SHENZHEN) COMPANY LIMITED, Shenzhen (CN)

(72) Inventors: Yuanfang Lv, Shenzhen (CN); Yuxiang Fan, Shenzhen (CN); Huaheng Fan, Shenzhen (CN); Qiong Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 14/746,780

(22) Filed: Jun. 22, 2015

(65) Prior Publication Data
US 2015/0289091 A1    Oct. 8, 2015

Related U.S. Application Data

(63) Continuation of application No. PCT/CN2013/087991, filed on Nov. 28, 2013.

(30) Foreign Application Priority Data

Dec. 20, 2012    (CN) .......................... 2012 1 0558948

(51) Int. Cl.
*H04W 4/02*    (2009.01)
*G06Q 30/02*    (2012.01)
*H04L 29/08*    (2006.01)

(52) U.S. Cl.
CPC ........... *H04W 4/02* (2013.01); *G06Q 30/0261* (2013.01); *H04L 67/26* (2013.01); *H04W 4/023* (2013.01); *H04L 67/20* (2013.01); *H04W 4/021* (2013.01)

(58) Field of Classification Search
CPC ... G06Q 30/0261; H04L 67/20; H04L 67/26; H04W 4/02; H04W 4/021; H04W 4/023
See application file for complete search history.

(56) References Cited

U.S. PATENT DOCUMENTS 4,973,952 A * 11/1990 Malec ................... B62B 3/1408
186/62
7,421,275 B1 * 9/2008 Hancock ................ G01C 21/20
455/456.1

(Continued)

FOREIGN PATENT DOCUMENTS

CN    202126705 U    1/2012
CN    102711035 A    10/2012

(Continued)

OTHER PUBLICATIONS

International Preliminary Report on Patentability and Written Opinion issued Jul. 2, 2015 re: Application No. PCT/CN2013/087991; pp. 1-6; citing: CN 102761823 A.

(Continued)

*Primary Examiner* — Kashif Siddiqui
(74) *Attorney, Agent, or Firm* — Cantor Colburn LLP

(57) ABSTRACT

A method and device for pushing information are provided. A common location of a user may be obtained. A distance between a central point of the common location of the user and a central point of a service providing area may be determined. Information may be pushed to an account of the user, when the distance is less than or equal to a preset threshold.

12 Claims, 5 Drawing Sheets

(56) References Cited

U.S. PATENT DOCUMENTS

| | | | |
|---|---|---|---|
| 2002/0062304 A1* | 5/2002 | Koike | G06Q 30/02 |
| 2002/0102993 A1* | 8/2002 | Hendrey | G06Q 10/00 455/456.3 |
| 2009/0319187 A1* | 12/2009 | Deeming | G06Q 30/02 701/300 |
| 2010/0317323 A1* | 12/2010 | Facemire | H04L 63/0492 455/411 |
| 2012/0108259 A1* | 5/2012 | Weiss | G06Q 30/0261 455/456.1 |
| 2013/0080457 A1* | 3/2013 | Narayanan | H04W 4/021 707/758 |
| 2015/0271808 A1* | 9/2015 | Liang | H04W 4/008 370/329 |

FOREIGN PATENT DOCUMENTS

| | | |
|---|---|---|
| CN | 102760174 A | 10/2012 |
| CN | 102761823 A | 10/2012 |

OTHER PUBLICATIONS

International Search Report issued Feb. 27, 2014 re: Application No. PCT/CN2013/087991; citing: CN 102761823 A, CN 102760174 A, CN 102711035 A and CN 202126705 A.

* cited by examiner

METHOD AND DEVICE FOR PUSHING INFORMATION

CROSS REFERENCE TO RELATED APPLICATIONS

This application is a U.S. continuation of International Application No. PCT/CN2013/087991, filed on Nov. 28, 2013. This application claims the benefit and priority of Chinese Patent Application No. 201210558948.X, filed Dec. 20, 2012. The entire disclosures of each of the above applications are incorporated by reference.

TECHNICAL FIELD

The present disclosure relates to Internet technologies, and more particularly, to a method and device for pushing information.

BACKGROUND

With the development of technology and popular usage of mobile terminals, more and more users start to receive various service information, and select useful advertisement information by means of mobile terminals, such that the lives of the users may be enriched.

In a conventional method, a Service Provider (SP) generally obtains a user's account. For example, the account may be a user number in a Subscriber Identity Module (SIM). Thus, when organizing various activities, the SP may push a variety of information to the user, so as to improve advertisement income of the SP, when enriching the user's life. During specific implementations, the SP may push information to all of the recorded user numbers by using an information pushing device. A user may utilize a used mobile terminal to receive various information pushed by the SP via a server of the SP, such as an information pushing device. The user may select useful information from the received information, and enjoy services provided by the useful information. For example, when a user has received discount information about a mall or cafe near the user's home, or about a website frequently used, the user may enjoy such a service. Alternatively, under the circumstances that a user has received advertising information, such as an exhibition organized by a certain group, or various socially useful activities, when the user is interested in the above advertising information and the condition allows, the user may also enjoy a service brought by the advertising information. Still alternatively, when a user has received making-friends information promoted by a making friends website, the user may also choose more interested friends, and so on.

In the conventional method, when an SP pushing various information to a user by using an information pushing device of the SP, the SP may generally employ a blind pushing mode. Only if a user number is recorded in the information pushing device of the SP, the SP will push information to the user, regardless of probability of the pushed information being referred to by the user. Thus, much information without being referred to by users may be pushed. Subsequently, information pushing efficiency of the SP may be relatively lower.

SUMMARY

To solve the problems in the conventional method, embodiments of the present disclosure provide a method and device for pushing information. The technical solutions may be as follows.

From one aspect, an information pushing method is provided, which includes:

obtaining a common location of a user;

determining a distance between a central point of the common location of the user and a central point of a service providing area; and pushing information to an account of the user, when the distance is less than or equal to a preset threshold.

From another aspect, an information pushing device is provided, which includes a memory, a processor in communication with the memory, and an interface, in which the memory stores an obtaining instruction, a determining instruction and a processing instruction, which are executable by the processor, the obtaining instruction indicates to obtain a common location of a user;

the determining instruction indicates to determine a distance between a central point of the common location of the user and a central point of a service providing area; and the processing instruction indicates to pushing information to an account of the user, when the distance is less than or equal to a preset threshold.

From still another aspect, a storage medium is provided, which stores an information pushing program, wherein when being executed, the information pushing program is to:

obtain a common location of a user;

determine a distance between a central point of the common location of the user and a central point of a service providing area; and push information to an account of the user, when the distance is less than or equal to a preset threshold.

In accordance with the method and device for pushing information provided by embodiments of the present disclosure, a common location of a user may be obtained. A distance between a central point of the common location of the user and a central point of a service providing area may be determined. And then, whether to push information to the account of the user may be determined, based on a relationship between the determined distance and a preset threshold. Subsequently, deficiencies of blind pushing in the prior art may be overcome. Whether to push information to an account of a user may be determined pertinently, based on common location of the user. Probability of pushed information being referred to by users may be improved. Subsequently, information pushing efficiency of an SP may also be enhanced.

BRIEF DESCRIPTIONS OF THE DRAWINGS

DETAILED DESCRIPTIONS

For simplicity and illustrative purposes, the present disclosure is described by referring to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used throughout the present disclosure, the term "includes" means includes but not limited to, the term "including" means including but not limited to. The term "based on" means based at least in part on. In addition, the terms "a" and "an" are intended to denote at least one of a particular element.

To make technical solutions and advantages of the present disclosure more clear, detailed descriptions about implementation modes of the present disclosure will be provided in the following, accompanying with attached figures.

Some examples will be described in the following.

Figure 1:
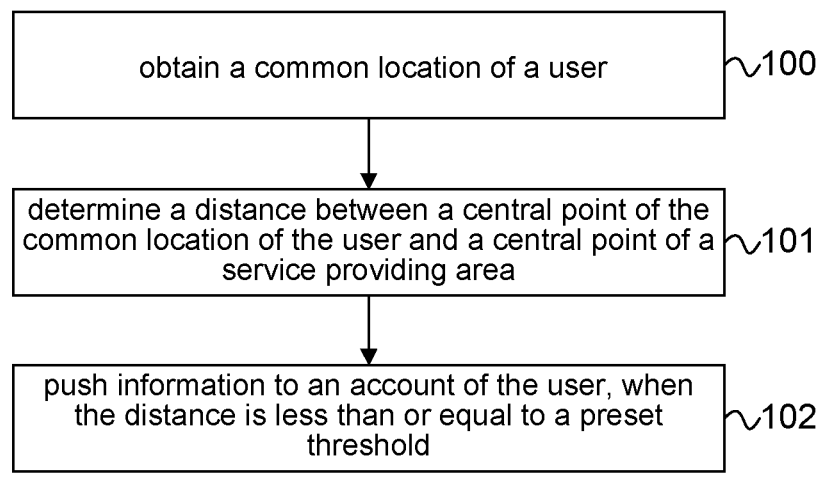
FIG. 1 is a flowchart illustrating a method for pushing information, in accordance with an embodiment of the present disclosure.

FIG. 1 is a flowchart illustrating a method for pushing information, in accordance with an embodiment of the present disclosure. As shown in FIG. 1, an executive agent of the information pushing method in the embodiment may be an information pushing device of an SP. Specifically speaking, the information pushing method in the embodiment may include the following blocks.

In block 100, obtain a common location of a user.

In block 101, determine a distance between a central point of the common location of the user and a central point of a service providing area.

In block 102, push information to an account of the user, when the distance is less than or equal to a preset threshold.

In the embodiment, the information pushed in block 102 may be information about the service providing area in block 101, e.g., the service providing area is an area, where an SP may provide commercial advertisement activities. For example, the service providing area may be a certain mall, a cafe, an exhibition hall, and so on. When a manager of the mall, cafe, or exhibition hall gives various business activities in the mall, cafe or exhibition hall, whether to push information to the account of the user may be determined, based on the distance between the central point of the common location of the user and the central point of the mall, cafe, or exhibition hall.

In accordance with the information pushing method provided by the embodiment, a common location of a user may be obtained. A distance between a central point of the common location of the user and a central point of a service providing area may be determined. Information may be pushed to an account of the user, when the distance is less than or equal to a preset threshold. Subsequently, the deficiencies of pushing information blindly in the prior art may be overcome. Whether to push information to the account of the user may be determined pertinently, based on the common location of the user. Thus, probability of the pushed information being referred to by users may be improved. And information pushing efficiency of the SP may also be enhanced.

On the basis of the technical solution provided by the embodiment illustrated with FIG. 1, the following technical may be further included.

Forbid pushing the information to the account of the user, when the distance between the central point of the common location of the user and the central point of the service providing area is greater than the preset threshold.

The preset threshold in the embodiment may be a distance value set based on practical experience.

By employing the foregoing technical solution, whether to push information to the account of the user may be determined pertinently, based on the common location of the user. Subsequently, probability of the pushed information being referred to by the user may be improved, and information pushing efficiency of an SP may also be enhanced.

Based on the technical solution of the embodiment illustrated with FIG. 1, specifically speaking, block 100 "obtain a common location of a user" may include the follows.

(1) Transmit a common location request of a user to an operator server, to which the account of the user belongs.

Specifically speaking, the account of the user in the embodiment may be a cell phone number of a SIM card of the user.

(2) Receive the common location of the user transmitted by the operator server.

In the embodiment, the common location of the user transmitted by the operator server may be transmitted, after the operator server receives an acknowledge from a mobile terminal of the user. For example, after receiving the common location request from an information pushing device of an SP, the operator server may transmit an acknowledgement request message to the account of the user, to request the user to acknowledge whether allow providing the common location of the user for the information pushing device of the SP. When the user allows, the operator server may then transmit the common location of the user to the information pushing device of the SP; otherwise, when the user does not allow, the operator server may forbid transmitting the common location of the user to the information pushing device of the SP.

On the basis of the technical solution provided by the embodiment illustrated with FIG. 1, specifically speaking, block 100 "obtain a common location of a user" may include the follows.

(a) Receive a historical trajectory of the user, which is transmitted by the operator server, to which the account of the user belongs.

In the embodiment, the historical trajectory of the user transmitted by the operator server may be transmitted, after the operator server receives the acknowledgment from the mobile terminal of the user.

(b) Obtain the common location of the user from the historical trajectory of the user.

Similarly, when receiving a historical trajectory request transmitted by the information pushing device of the SP, the operator server may transmit an acknowledgment request message to the account of the user, so as to request the user to acknowledge whether allow providing the historical trajectory of the user for the information pushing device of the SP. When the user allows, the operator server may transmit the historical trajectory of the user to the information pushing device of the SP; otherwise, when the user does not allow, the operator server may forbid transmitting the historical trajectory of the user to the information pushing device of the SP.

Furthermore, specifically speaking, block (b) in the foregoing embodiment "obtain the common location of the user from the historical trajectory of the user" may include the follows.

(a1)) Determine at least one residence area from the historical trajectory of the user.

In the embodiment, radius of each residence area may be less than a preset radius threshold. Residence duration of a residence area may be greater than or equal to a preset time threshold. For example, the preset radius threshold may be 500 meters, and the preset time threshold may be 30 minutes. For example, the preset radius threshold may be adjusted based on practical requirements, such as 400 meters, 800 meters, 1000 meters, and so on. The preset time threshold may also be adjusted based on practical requirements, such as 25 minutes, 40 minutes, 50 minutes, 60 minutes, and so on. Specifically speaking, the residence area in the embodiment may include the following attributes, such as center latitude, center longitude, arrival time, departure time, number of track points, geohash value. Calculation about the geohash value may refer to related prior art, which is not repeated here.

(b1) Calculate the geohash value of the residence area, based on the center latitude and center longitude of the residence area.

The specific calculation process may refer to related prior art, which is not repeated here.

(c1) Merge residence areas with the same geohash value into a residence location, and obtain at least one residence location.

(d1) Take a residence location with the maximum residence number in the at least one residence location as the common location of the user.

For example, specifically speaking, block (a1)) "determine at least one residence area from the historical trajectory of the user" may include the follows.

(i) Select a track point from the historical trajectory of the user as a central point.

The selected central point may be selected based on a chronological order. For example, when firstly select a track point as the central point, select a first point from the historical trajectory of the user as the track point. When select another track point to be taken as the central point each time subsequently, select a next track point of the track point, which has been taken as the central point previously, as the central point.

(ii) And then select a reference point corresponding to the central point.

The selected reference point may be selected based on the chronological order from the historical trajectory of the user. For example, regarding each central point, the reference point firstly selected may be the next track point of the central point. For the central point, when it is necessary to obtain a reference point, the corresponding reference point may be the next track point of the reference point selected previously.

(iii) Calculate a time difference between the central point and the reference point.

(iv) Determine whether the time difference is greater than a preset time threshold T. When the time difference is greater than the preset time threshold T, proceed with block (v); otherwise, when the time difference is less than or equal to the preset time threshold T, proceed with block (ii).

(v) Calculate a distance between the central point and the reference point.

(vi) Determine whether the distance is greater than a preset radius threshold R. When the distance is greater than the preset radius threshold R, proceed with block (i); otherwise, when the distance is less than or equal to the preset radius threshold R, proceed with block (vii).

(vii) Take a next nearest adjacent track point of the reference point in the historical trajectory of the user as the reference point, and proceed with block (viii).

(viii) Calculate a distance between the central point and the reference point.

(ix) Determine whether the distance is greater than the preset radius threshold R. When the distance is greater than the preset radius threshold R, proceed with block (x); otherwise, when the distance is less than or equal to the preset radius threshold R, proceed with block (vii).

(x) Take all of the track points between the central point and the reference point as one residence area, and return back to proceed with block (i), until the central point becomes the last track point in the historical trajectory of the user.

The average latitude and average longitude about all of the track points in the residence area may be respectively taken as a center latitude and center longitude of the residence area. Arrival time refers to the time about the first track point in the residence area. Departure time refers to the time of the last track point.

Furthermore, the residence location of the foregoing embodiment may also be extended. For example, after block (c1) "merge residence areas with the same geohash value into a residence location, and obtain at least one residence location", before block (d1) "take a residence location with the maximum residence number in the at least one residence location as the common location of the user", the following may be included. Calculate the geohash value about each of eight nearest adjacent residence locations of the residence location. When a difference between the geohash value of the residence location and the geohash value of the nearest adjacent residence location is less than or equal to a preset data threshold, merge a residence location with the shorter residence duration, and/or, less residence number, which is selected from the residence location and the nearest adjacent residence location, into the other residence location not selected from the residence location and the nearest adjacent residence location.

In practical applications, under the circumstances that a user registers to be a member of an SP, when the user registers, the user may identify the common location of the user in registration information. At this time, the information pushing device of the SP may determine whether to push information to the account of the user, based on the common location of the user. Alternatively, the information pushing device of the SP may also employ other modes to obtain the common location of the user, which is not repeated here.

In accordance with the information pushing method provided by the foregoing embodiment, all of the optional technical solutions about examples of the present disclosure may be provided. All of the optional technical solutions of the foregoing embodiment may be combined in any way in the manner of a combinable mode to form an optional embodiment of the present disclosure, which will not be repeated here.

Based on the information pushing method provided by the foregoing embodiment, the deficiencies of blindly pushing information in the prior art may be overcome. Thus, whether to push information to an account of a user may be determined pertinently, based on common location of the user. Subsequently, probability of the pushed information being referred to by the user may be improved, and information pushing efficiency of the SP may also be enhanced.

Figure 2:
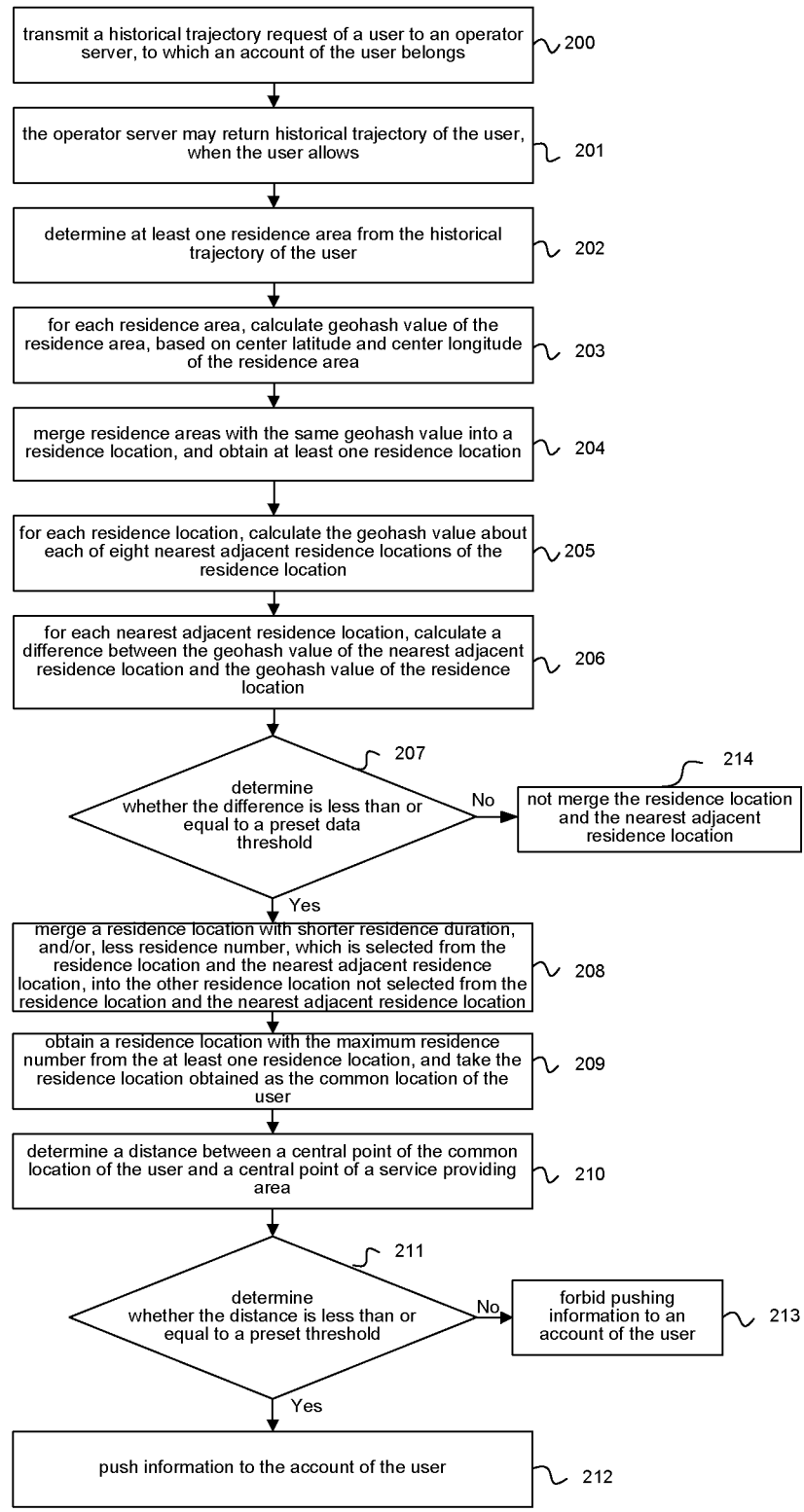
FIG. 2 is a flowchart illustrating a method for pushing information, in accordance with an embodiment of the present disclosure.

FIG. 2 is a flowchart illustrating a method for pushing information, in accordance with an embodiment of the present disclosure. Based on the foregoing embodiment, the information pushing method of the embodiment describes the technical solution more detailed. The executive agent of the information pushing method in the embodiment may still be an information pushing device of an SP. As shown in FIG. 2, specifically speaking, the information pushing method of the embodiment may include the following blocks.

In block 200, transmit a historical trajectory request of a user to an operator server, to which an account of the user belongs.

In block 201, the operator server may return historical trajectory of the user, when the user allows.

In block 202, determine at least one residence area from the historical trajectory of the user.

In block 203, regarding each residence area, calculate the geohash value of the residence area, based on center latitude and center longitude of the residence area.

In block 204, merge residence areas with the same geohash value into a residence location, and obtain at least one residence location.

In block 205, for each residence location, calculate the geohash value about each of eight nearest adjacent residence locations of the residence location.

In block 206, for each nearest adjacent residence location, calculate a difference between the geohash value of the nearest adjacent residence location and the geohash value of the residence location.

In block 207, determine whether the difference is less than or equal to a preset data threshold. When the difference is less than or equal to the preset data threshold, proceed with block 208; otherwise, when the difference is greater than the preset data threshold, proceed with block 214, that is, not merge the residence location and the nearest adjacent residence location.

In block 208, merge a residence location with the shorter residence duration, and/or, less residence number, which is selected from the residence location and the nearest adjacent residence location, into the other residence location not selected from the residence location and the nearest adjacent residence location By employing the foregoing blocks 200 to 208, at least one residence location may be finally obtained.

In block 209, take a residence location with the maximum residence number, which is selected from the at least one residence location, as the common location of the user.

In block 210, determine a distance between a central point of the common location of the user and a central point of a service providing area.

In block 211, determine whether the distance is less than or equal to a preset threshold. When the distance is less than or equal to the preset threshold, proceed with block 212; otherwise, when the distance is greater than the preset threshold, proceed with block 213.

In block 212, push information to the account of the user.

In block 213, forbid pushing information to the account of the user.

During specific implementations, it may refer to technical solution of foregoing FIG. 1 and subsequent optional technical solutions of FIG. 1, which will not be repeated here.

In accordance with the information pushing method provided by the embodiment, the common location of the user may be obtained. Whether to push information to the account of the user may be determined, based on the distance between the central point of the common location of the user and the central point of the service providing area. Thus, the deficiencies of pushing information blindly in the prior art may be overcome. Whether to push information to the account of the user may be determined pertinently, based on the common location of the user. Subsequently, probability of the pushed information being referred to by the user may be improved, and information pushing efficiency of the SP may also be enhanced.

Figure 3:
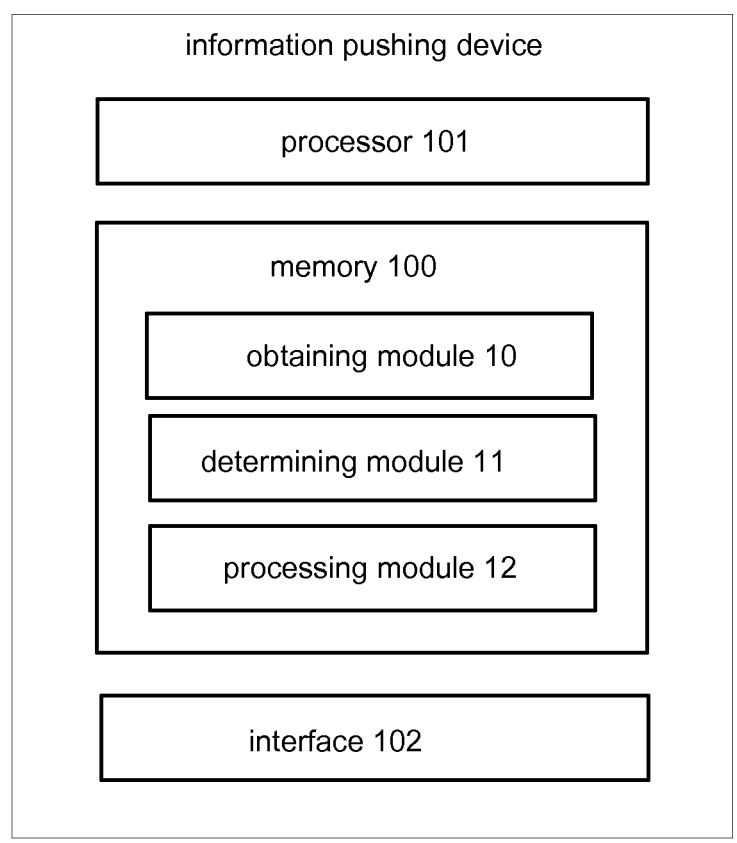
FIG. 3 is a schematic diagram illustrating structure of an information pushing device, in accordance with an embodiment of the present disclosure.

FIG. 3 is a schematic diagram illustrating structure of an information pushing device, in accordance with an embodiment of the present disclosure. As shown in FIG. 3, specifically speaking, the information pushing device in the embodiment may include a memory 100, a processor 101 in communication with the memory 100, and an interface 102. The memory 100 may store an obtaining module 10, a determining module 11 and a processing module 12, which are executable by the processor 101.

When being executed by the processor 101, the obtaining module 10 is configured to obtain a common location of a user via the interface 102. The determining module 11 may be connected with the obtaining module 10. When being executed by the processor 101, the determining module 11 is configured to determine a distance between a central point of the common location of the user and a central point of a service providing area, in which the common location of the user is obtained by the obtaining module 10. The processing module 12 may be connected with the determining module 11. When being executed by the processor 101, the processing module 12 is configured to push information to an account of the user, when the distance is less than or equal to a preset threshold.

Mechanism of pushing information with the foregoing modules in the information pushing device provided by the embodiment may refer to the implementation mechanism and descriptions of foregoing related method embodiments, which are not repeated here.

By using the foregoing modules in the information pushing device of the embodiment, a common location of a user may be obtained. A distance between a central point of the common location of the user and a central point of a service providing area may be determined. Information may be pushed to the account of the user, when the distance is less than or equal to a preset threshold. Thus, the deficiencies of pushing information blindly in the prior art may be overcome. Whether to push information to the account of the user may be determined pertinently, based on the common location of the user. Subsequently, probability of the pushed information being referred to by the user may be improved, and information pushing efficiency of the SP may also be enhanced.

Figure 4:
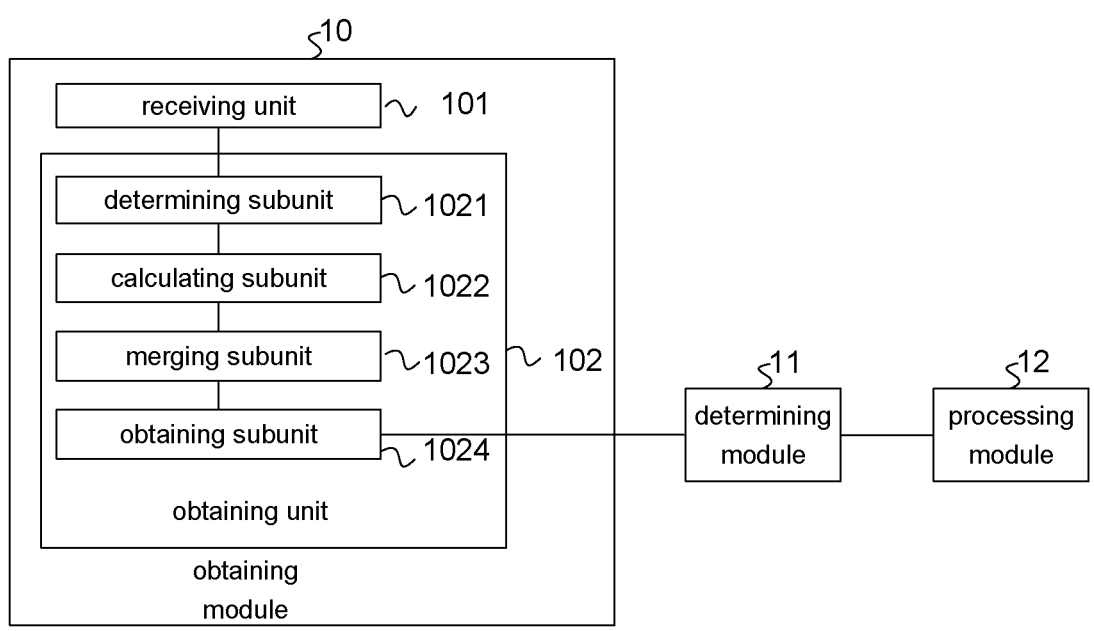
FIG. 4 is a schematic diagram illustrating structure of an information pushing device, in accordance with an embodiment of the present disclosure.

FIG. 4 is a schematic diagram illustrating structure of an information pushing device, in accordance with an embodiment of the present disclosure. As shown in FIG. 4, specifically speaking, based on the embodiment illustrated with FIG. 3, the information pushing device in the embodiment may include the following optional technical solutions.

Specifically speaking, When the distance determined by the determining module 11 is greater than the preset threshold, the processing module 12 is configured to forbid pushing information to the account of the user.

Specifically speaking, the obtaining module 10 in the information pushing device of the embodiment is configured to transmit a common location request of a user to an operator server, to which the account of the user belongs, and receive the common location of the user transmitted by the operator server. The common location of the user transmitted by the operator server may be transmitted, after the operator server has received an acknowledgement from a mobile terminal of the user.

As shown in FIG. 4, specifically speaking, the obtaining module 10 in the information pushing device of the embodiment may include a receiving unit 101 and an obtaining module 102. The receiving unit 101 is configured to receive a historical trajectory of a user from the operator server, to which the account of the user belongs. The historical trajectory of the user transmitted by the operator server may be transmitted, after the operator server has received the acknowledgement from the mobile terminal of the user. The obtaining unit 102 may be connected with the receiving unit 101. The obtaining unit 102 is configured to obtain the common location of the user from the historical trajectory of the user, which is received by the receiving unit 101.

As shown in FIG. 4, specifically speaking, the obtaining unit 102 in the embodiment may further include a determining subunit 1021, a calculating subunit 1022, a merging subunit 1023 and an obtaining subunit 1024.

The determining subunit 1021 may be connected with the receiving unit 101. The determining subunit 1021 is configured to determine at least one residence area from the historical trajectory of the user received by the receiving unit 101. Radius of each residence area may be less than a preset radius threshold. Residence duration of the residence area may be greater than or equal to a preset time threshold. The calculating subunit 1022 may be connected with the determining subunit 1021. The calculating subunit 1022 is configured to calculate the geohash value of each residence area, based on the determined center latitude and center longitude of each residence area. The merging subunit 1023 may be connected with the calculating subunit 1022. The merging subunit 1023 is configured to merge residence areas with the same geohash value into a residence location, and obtain at least one residence location, based on the geohash value about the residence area calculated by the calculating subunit 1022. The obtaining subunit 1024 may be connected with the merging subunit 1023. The obtaining subunit 1024 is configured to obtain a residence location with the maximum residence number from the at least one residence location, which is merged by the merging subunit 1023, and take the residence location obtained as the common location of the user. At this time, the corresponding determining module 11 may be connected with the obtaining subunit 1024.

Furthermore, in the information pushing device of the embodiment, after the merging subunit 1023 merges the residence areas with the same geohash value into the residence location, and obtains at least one residence location, before the obtaining subunit 1024 obtains the residence location with the maximum residence number selected from the at least one residence location, takes the residence location obtained as the common location of the user, the calculating subunit 1022 is configured to calculate the geohash value about each of eight nearest adjacent residence locations of the residence location. When a difference between the geohash value of the residence location and the geohash value of the nearest adjacent residence location is less than or equal to a preset data threshold, the merging subunit 1023 is further configured to merge a residence location with the shorter residence duration, and/or, the less residence number, which is selected from the residence location and the nearest adjacent residence location, into the other residence location not selected from the residence location and the nearest adjacent residence location.

Mechanism for pushing information with the foregoing modules in the information pushing device of the embodiment is similar to implementation mechanism of the foregoing related methods embodiment, which may refer to descriptions of the foregoing embodiment and will not be repeated here.

By employing the foregoing modules in the information pushing device of the embodiment, the deficiencies of pushing information blindly in the prior art may be overcome. Whether to push information to the account of the user may be determined pertinently, based on the common location of the user. Thus, probability of the pushed information being referred to by the user may be improved, and information pushing efficiency of the SP may also be enhanced.

It should be noted that, the information pushing scheme in the embodiment may be applicable to the following scenes.

Based on merchant's recommendation of the common location of the user, select a point of interest (POI) merchant around the common location of the user, and perform a targeted precise recommendation.

Analyze the distance among users' common locations, in a Social Network Service (SNS) applications and microblog applications, mutually recommend users with adjacent common locations.

In the microblog or SNS applications, based on the calculated common location, when a user is not in the common location, an automatic notification with a location broadcast or registration message may be generated among buddies. When a user is in the common location, repeat reminder is not necessary.

In addition to the foregoing scenes, the technical solutions about embodiments of the present disclosure may be also applicable to other scenes, which will not be repeated here.

It should be noted that, when pushing information with the information pushing device of the foregoing embodiments, division of foregoing each functional module is taken for an example to describe. In practical applications, foregoing functions may be allocated to different functional modules to be completed, based on requirements. That is, the internal structure of the device may be divided into different functional modules, so as to complete all of or part of functions described above. Besides, conception of the information pushing device in the foregoing embodiment is the same as that of the information pushing method described in the foregoing embodiments. The specific implementation process of the information pushing device may refer to detailed descriptions about method embodiments, which is not repeated here.

Numbers of foregoing embodiments of the present disclosure are provided for descriptions, which does not demonstrate best or better embodiments.

Persons having ordinary skill in the art may understand that all of or part of blocks in the foregoing embodiments may be completed with hardware, or with related hardware instructed by a program. The program may be stored in a computer readable storage medium. The foregoing storage medium may be a read-only memory (ROM), a disk, a compact disc (CD), and so on.

Figure 5:
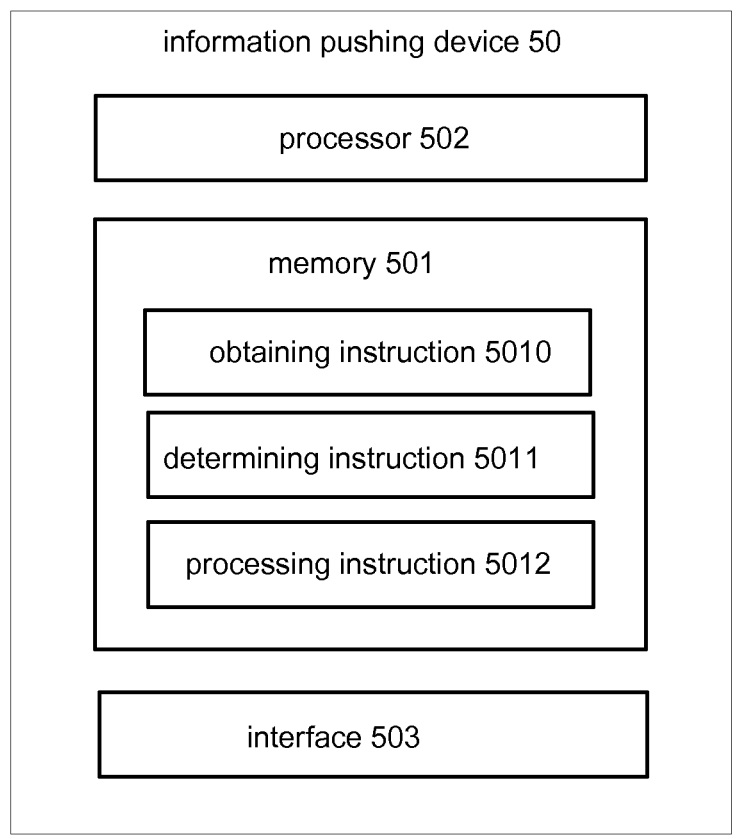
FIG. 5 is a schematic diagram illustrating structure of an information pushing device, in accordance with an embodiment of the present disclosure.

FIG. 5 is a schematic diagram illustrating structure of an information pushing device, in accordance with an embodiment of the present disclosure. As shown in FIG. 5, specifically speaking, the information pushing device 50 in the embodiment may include a memory 501, a processor 502 in communication with the memory 501, and an interface 503. The memory 501 may store an obtaining instruction 5010, a determining instruction 5011 and a processing instruction 5012, which are executable by the processor 502.

The obtaining instruction 5010 indicates to obtain a common location of a user via the interface 503. The determining instruction 5011 indicates to determine a distance between a central point of the common location of the user and a central point of a service providing area, in which the common location of the user is obtained based on the obtaining instruction 5010. The processing instruction 5012 indicates to determine whether to push information to an account of the user, based on a relationship between a preset threshold and the distance determined based on the determining instruction 5011.

Specifically speaking, when the distance determined based on the determining instruction 5011 is less than or equal to the preset threshold, the processing instruction 5012 may indicate to push information to the account of the user. When the distance determined based on the determining instruction 5011 is greater than the preset threshold, the processing instruction 5012 may indicate to forbid pushing information to the account of the user.

The obtaining instruction 5010 may further indicate to transmit a common location request of a user to an operator server, to which the account of the user belongs, and receive the common location of the user transmitted by the operator server. The common location of the user transmitted by the operator server may be transmitted, after the operator server has received an acknowledgement from a mobile terminal of the user.

The obtaining instruction 5010 may further include a receiving instruction and a first obtaining instruction (not shown in the figure), which are executable by the processor 502. The first obtaining instruction may further include a first determining instruction, a calculating instruction, a merging instruction and a second obtaining instruction (not shown in the figure), which are executable by the processor 502.

When being executed, functions implemented by the receiving instruction, the first obtaining instruction, the first determining instruction, the calculating instruction, the merging instruction and the second obtaining instruction may be respectively same as that implemented by the receiving unit 101, the obtaining unit 102, the determining subunit 1021, the calculating subunit 1022, the merging subunit 1023 and the obtaining subunit 1024 in the foregoing embodiment, which are not repeated here.

Mechanism for pushing information with the foregoing memory 501, processor 502, interface 503, and instructions stored in the memory 501, which are executable by the processor 502 in the information pushing device 50 of the embodiment is similar to implementation mechanism of the foregoing related methods embodiments, which may refer to descriptions of the foregoing embodiments and will not be repeated here.

The present disclosure also provides a storage medium. The storage medium may use any type of recording mode, e.g., paper storage medium (such as paper tape), magnetic storage medium (such as floppy disk, hard disk, flash), optical storage medium (such as Compact Disk (CD)-Read-only Memory (ROM)), magneto-optical storage medium (such as MO), and so on. The storage medium may store one or more instructions, which, when executed by one or more processor, cause the one or more processor to:

obtain a common location of a user;

determine a distance between a central point of the common location of the user and a central point of a service providing area; and push information to an account of the user, when the distance is less than or equal to a preset threshold.

Furthermore, when being executed, the one or more instructions further cause the one or more processor to:

forbid pushing the information to the account of the user, when the distance is greater than the preset threshold.

Furthermore, when being executed, the one or more instructions further cause the one or more processor to:

transmit a common location request of the user to an operator server, to which the account of the user belongs;

receive the common location of the user transmitted by the operator server, wherein the common location of the user transmitted by the operator server is transmitted, after the operator server has received an acknowledgement from a mobile terminal of the user.

Furthermore, when being executed, the one or more instructions further cause the one or more processor to:

receive a historical trajectory of the user transmitted by an operator server, to which the account of the user belongs, wherein the historical trajectory of the user transmitted by the operator server is transmitted, after the operator server has received an acknowledgement from a mobile terminal of the user; and obtain the common location of the user from the historical trajectory of the user.

Furthermore, when being executed, the one or more instructions further cause the one or more processor to:

determine at least one residence area from the historical trajectory of the user, wherein a radius of each residence area is less than a preset radius threshold, residence duration of the residence area is greater than or equal to a preset time threshold;

calculate a geohash value of the residence area, based on a center latitude and a center longitude of the residence area;

merge residence areas with the same geohash value into a residence location, and obtain at least one residence location;

obtain a residence location with the maximum residence number from the at least one residence location, and take the residence location obtained as the common location of the user.

Furthermore, when being executed, the one or more instructions further cause the one or more processor to:

after merging the residence areas with the same geohash value into the residence location, and obtaining at least one residence location, and before obtaining the residence location with the maximum residence number from the at least one residence location, and taking the residence location obtained as the common location of the user, calculate the geohash value about each of eight nearest adjacent residence locations of the residence location;

when a difference between the geohash value of the residence location and the geohash value of the nearest adjacent residence location is less than or equal to a preset data threshold, merge a residence location with a shorter residence duration, and/or, less residence number, which is selected from the residence location and the nearest adjacent residence location, into the other residence location which is not selected from the residence location and the nearest adjacent residence location.

By employing the information pushing device of the embodiment, the deficiencies of pushing information blindly in the prior art may be overcome. Whether to push information to the account of the user may be determined pertinently, based on the common location of the user. Thus, probability of the pushed information being referred to by the user may be improved, and information pushing efficiency of the SP may also be enhanced.

The invention claimed is:

1. An information pushing method, comprising:
   obtaining a common location of a user;
   determining a distance between a central point of the common location of the user and a central point of a service providing area; and
   pushing information to an account of the user, when the distance is less than or equal to a preset threshold;
   wherein obtaining the common location of the user comprises:

transmitting a common location request of the user to an operator server, to which the account of the user belongs;

receiving the common location of the user transmitted by the operator server, wherein the common location of the user transmitted by the operator server is transmitted, after the operator server has received an acknowledgement from a mobile terminal of the user; or, receiving a historical trajectory of the user transmitted by an operator server, to which the account of the user belongs, wherein the historical trajectory of the user transmitted by the operator server is transmitted, after the operator server has received an acknowledgement from a mobile terminal of the user; and obtaining the common location of the user from the historical trajectory of the user.

2. The method according to claim 1, further comprising:
forbidding pushing the information to the account of the user, when the distance is greater than the preset threshold.

3. The method according to claim 1, wherein obtaining the common location of the user from the historical trajectory of the user comprises:

determining at least one residence area from the historical trajectory of the user, wherein a radius of each residence area is less than a preset radius threshold, residence duration of the residence area is greater than or equal to a preset time threshold;

calculating a geohash value of the residence area, based on a center latitude and a center longitude of the residence area;

merging residence areas with the same geohash value into a residence location, and obtaining at least one residence location;

obtaining a residence location with the maximum residence number from the at least one residence location, and taking the residence location obtained as the common location of the user.

4. The method according to claim 3, further comprising:
after merging the residence areas with the same geohash value into the residence location, and obtaining at least one residence location, and before obtaining the residence location with the maximum residence number from the at least one residence location, and taking the residence location obtained as the common location of the user, calculating the geohash value about each of eight nearest adjacent residence locations of the residence location;

when a difference between the geohash value of the residence location and the geohash value of the nearest adjacent residence location is less than or equal to a preset data threshold, merging a residence location with a shorter residence duration, and/or, less residence number, which is selected from the residence location and the nearest adjacent residence location, into the other residence location which is not selected from the residence location and the nearest adjacent residence location.

5. An information pushing device, comprising a memory, a processor in communication with the memory, and an interface, wherein the memory stores an obtaining instruction, a determining instruction and a processing instruction, which are executable by the processor, the obtaining instruction indicates to obtain a common location of a user;

the determining instruction indicates to determine a distance between a central point of the common location of the user and a central point of a service providing area; and the processing instruction indicates to push information to an account of the user, when the distance is less than or equal to a preset threshold;

wherein the obtaining instruction further indicates to transmit a common location request of the user to an operator server, to which the account of the user belongs, receive the common location of the user transmitted by the operator server, wherein the common location of the user transmitted by the operator server is transmitted, after the operator server has received an acknowledgement from a mobile terminal of the user; or, wherein the obtaining instruction comprises a receiving instruction and a first obtaining instruction, the receiving instruction indicates to receive a historical trajectory of the user transmitted by an operator server, to which the account of the user belongs, wherein the historical trajectory of the user transmitted by the operator server is transmitted, after the operator server has received an acknowledgement from a mobile terminal of the user; and the first obtaining instruction indicates to obtain the common location of the user from the historical trajectory of the user.

6. The device according to claim 5, wherein the processing instruction further indicates to forbid pushing the information to the account of the user, when the distance is greater than the preset threshold.

7. The device according to claim 5, wherein the first obtaining instruction comprises a first determining instruction, a calculating instruction, a merging instruction and a second obtaining instruction, the first determining instruction indicates to determine at least one residence area from the historical trajectory of the user, wherein a radius of each residence area is less than a preset radius threshold, residence duration of the residence area is greater than or equal to a preset time threshold;

the calculating instruction indicates to calculate a geohash value of the residence area, based on a center latitude and a center longitude of the residence area;

the merging instruction indicates to merge residence areas with the same geohash value into a residence location, and obtain at least one residence location; and the second obtaining instruction indicates to obtain a residence location with the maximum residence number from the at least one residence location, and take the residence location obtained as the common location of the user.

8. The device according to claim 7, wherein the calculating instruction further indicates to calculate the geohash value about each of eight nearest adjacent residence locations of the residence location, after the residence areas with the same geohash value have been merged into the residence location, and at least one residence location have been obtained based on the merging instruction, and before the residence location with the maximum residence number, which is selected from the at least one residence location, has been taken as the common location of the user based on the second obtaining instruction;

the merging instruction further indicates to merge a residence location with shorter residence duration, and/or, less residence number, which is selected from the residence location and the nearest adjacent residence location, into the other residence location, which is not selected from the residence location and the nearest adjacent residence location, when a difference between the geohash value of the residence location and the geohash value of the nearest adjacent residence location is less than or equal to a preset data threshold.

9. A non-transitory storage medium having stored therein one or more instructions, which, when executed by one or more processor, cause the one or more processor to:
obtain a common location of a user;
determine a distance between a central point of the common location of the user and a central point of a service providing area; and
push information to an account of the user, when the distance is less than or equal to a preset threshold;
wherein when being executed, the one or more instructions further cause the one or more processor to:
transmit a common location request of the user to an operator server, to which the account of the user belongs;
receive the common location of the user transmitted by the operator server, wherein the common location of the user transmitted by the operator server is transmitted, after the operator server has received an acknowledgement from a mobile terminal of the user; or,
receive a historical trajectory of the user transmitted by an operator server, to which the account of the user belongs, wherein the historical trajectory of the user transmitted by the operator server is transmitted, after the operator server has received an acknowledgement from a mobile terminal of the user; and
obtain the common location of the user from the historical trajectory of the user.

10. The non-transitory storage medium according to claim 9, wherein when being executed, the one or more instructions further cause the one or more processor to:
forbid pushing the information to the account of the user, when the distance is greater than the preset threshold.

11. The non-transitory storage medium according to claim 9, wherein when being executed, the one or more instructions further cause the one or more processor to:
determine at least one residence area from the historical trajectory of the user, wherein a radius of each residence area is less than a preset radius threshold, residence duration of the residence area is greater than or equal to a preset time threshold;
calculate a geohash value of the residence area, based on a center latitude and a center longitude of the residence area;
merge residence areas with the same geohash value into a residence location, and obtain at least one residence location;
obtain a residence location with the maximum residence number from the at least one residence location, and take the residence location obtained as the common location of the user.

12. The non-transitory storage medium according to claim 11, wherein when being executed, the one or more instructions further cause the one or more processor to:
after merging the residence areas with the same geohash value into the residence location, and obtaining at least one residence location, and
before obtaining the residence location with the maximum residence number from the at least one residence location, and taking the residence location obtained as the common location of the user,
calculate the geohash value about each of eight nearest adjacent residence locations of the residence location;
when a difference between the geohash value of the residence location and the geohash value of the nearest adjacent residence location is less than or equal to a preset data threshold, merge a residence location with a shorter residence duration, and/or, less residence number, which is selected from the residence location and the nearest adjacent residence location, into the other residence location which is not selected from the residence location and the nearest adjacent residence location.

* * * * *